United States Patent [19]

Kitta

[11] Patent Number: 5,394,530
[45] Date of Patent: Feb. 28, 1995

[54] ARRANGEMENT FOR PREDICTING A BRANCH TARGET ADDRESS IN THE SECOND ITERATION OF A SHORT LOOP

[75] Inventor: Mayumi Kitta, Yamanashi, Japan

[73] Assignee: NEC Corporation, Tokyo, Japan

[21] Appl. No.: 199,970

[22] Filed: Feb. 22, 1994

Related U.S. Application Data

[63] Continuation of Ser. No. 852,063, Mar. 16, 1992, abandoned.

[30] Foreign Application Priority Data

Mar. 15, 1991 [JP] Japan .................................. 3-74433

[51] Int. Cl.6 .............................................. G06F 9/00
[52] U.S. Cl. .................... 395/375; 395/425; 364/261.3; 364/263.1
[58] Field of Search ......................................... 395/375

[56] References Cited

U.S. PATENT DOCUMENTS

4,430,706  2/1984  Sand ..................... 395/375
4,984,154  1/1991  Hanatani et al. ...... 395/375
4,991,080  2/1991  Emma et al. .......... 395/375
5,142,634  8/1992  Fite et al. ............. 395/375
5,313,634  5/1994  Eickemyer ............. 395/700
5,317,702  5/1994  Morisada ............... 395/375

Primary Examiner—Parshotam S. Lall
Assistant Examiner—Brian Ledell
Attorney, Agent, or Firm—Foley & Lardner

[57] ABSTRACT

Improved techniques for predicting a branch target address using a branch history table (BHT), is disclosed. The BHT stores a plurality of pairs of a branch address and corresponding branch target address. In order to eliminate or effectively reduce loss of machine cycles in the branch target address prediction, a prefetched address data is compared with an incoming new branch instruction address before being applied to a BHT (branch history table) for the purpose of updating same. When the coincidence is detected, a selector selects a new branch target address before being applied to the BHT. The selected new branch target address is fed to an instruction address prefetch register.

6 Claims, 8 Drawing Sheets

ARRANGEMENT FOR PREDICTING A BRANCH TARGET ADDRESS IN THE SECOND ITERATION OF A SHORT LOOP

This application is a continuation of application Ser. No. 07/852,063, filed Mar. 16, 1992, now abandoned.

BACKGROUND OF THE INVENTION

1. Field of the Invention

The present invention relates generally to an arrangement for predicting a branch target address using a branch history table (BHT) in a digital data processing system, and more specifically to such an arrangement by which a branch target address can be predicted irrespective of a time duration for which the BHT is renewed or updated.

2. Description of the Prior Art

In most pipeline processors, branch instructions are resolved in an execution unit. Accordingly, there are several cycles of delay between the decoding of a branch instruction and its execution/resolution. In an attempt to overcome the potential loss of these cycles, it is known in the art to guess, using a BHT, as to which instruction specified by a branch target address is to be applied to the execution unit.

Before turning to the present invention it is deemed advantageous to briefly discuss a known technique with reference to FIGS. 1–4.

Figure 1:
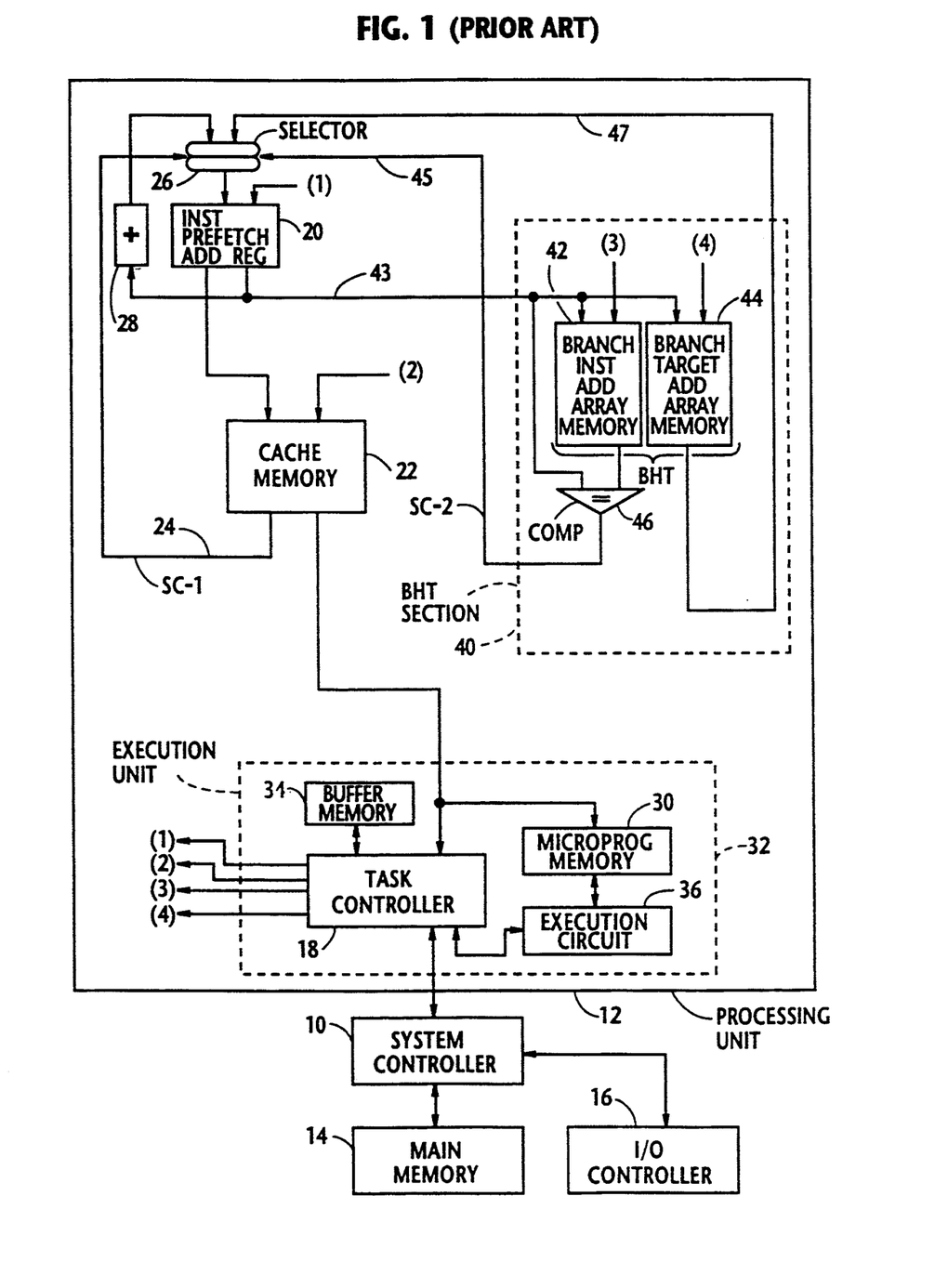
FIG. 1 is a block diagram showing the prior art arrangement discussed in the opening paragraphs of the instant disclosure.

FIG. 1 is a block diagram showing schematically a known arrangement of the type to which the present invention is applicable. As shown in FIG. 1, a system controller 10 is operatively coupled with a processing unit 12, a main memory 14 and an input/output (I/O) controller 16.

A task controller 18, provided in the processing unit 12, applies an initial instruction address of a given job to an instruction prefetch address register 20 through a line (1). It is assumed that a cache memory 22 has already stored the whole or part of the instruction array (sequence) of the above-mentioned given job which is applied from the task controller 18 via a line (2). The cache memory 22 is supplied with the prefetched address from the address register 20 and, searches for an instruction specified by the prefetched address.

Upon a cache hit, the cache memory 22 applies the corresponding instruction to the task controller 18 and also to a microprogram memory 30, both of which form part of an execution unit 32. The microprogram memory 30 has previously stored a plurality of microprograms for executing an instruction applied thereto of the given job. The execution unit 32 further comprises a buffer memory 34 and an execution circuit 36. The buffer memory 34 stores operand data in this case, while the execution circuit 36 runs or carries out the microprograms using the operand data within the buffer memory 34 under the control of the task controller 18.

In the case of the cache hit, the cache memory 22 issues a selector control signal SC-1 which is applied to a selector 26 via a line 24. An adder 28 is provided to increment the instruction address relating to the cache hit by predetermined bytes in order to derive the next instruction address. In more specific terms, upon occurrence of the cache hit, the control signal SC-1 allows the selector 26 to apply the content thereof to the register 20 and, thus the next instruction address data is stored in the instruction prefetch address register 20.

Contrarily, in the case of a cache miss, the contents of the cache memory 22 is renewed in a manner well known in the art.

As indicated above, the reduction of branch penalty (viz., loss of cycles) is attempted through the use of history focussed on instruction prefetching. A BHT utilizes the address of the instruction array (viz., stream) being prefetched for accessing the table. If a taken branch were previously encountered at that address, the BHT indicates so and, in addition, provides the target address of the branch on its previous execution. This target address is used to redirect instruction prefetching because of the likelihood that the branch will repeat its past behaviour. The advantage of such an approach is that it has the potential of eliminating all delays associated with branches.

As shown in FIG. 1, a BHT section 40 includes a BHT which is established within a branch instruction address (BIA) array memory 42 and a branch target address (BTA) array memory 44. The BHT section 40 further includes a comparator 46. The BIA array memory 42 stores a plurality of branch instruction addresses, while the BTA array memory 44 a plurality of branch target addresses which correspond, on one to one basis, to the counterparts stored in the memory 42. The instruction prefetch address register 20 supplies the two memories 42, 44 with a prefetched instruction address via a line 43. The comparator 46 is provided to compare the prefetched instruction address from the register 20 and the output (viz., branch instruction address) of the memory 42. If the comparator 46 detects coincidence of the two instruction addresses applies (viz., a hit), it outputs a selector control signal SC-2 indicative of the hit over a line 45 and thus allows the selector 26 to supply the register 20 with the corresponding branch target which is derived from the memory 44 through a line 47. Following this, the instruction specified by the address of the branch target is searched at the cache memory 22. Contrarily, in the event that the comparator 46 notes a miss hit, it issues the control signal SC-2 representing same and thus inhibits the application of the output of the memory 44 to the register 20.

Writing a new piece of branch information into the BHT (viz., updating of BHT) is implemented under the control of the task controller 18. In more specific terms, when the task controller 18 detects that the execution circuit 36 fails to execute the branched instruction due to the failure of the branch target address prediction, the task controller 18 updates the BHT by writing a more likely pair of branch address and the corresponding branch target address into the memories 42, 44 via lines (3), (4).

The operations of the BHT section 40 will be further discussed with reference to FIGS. 2A, 2B, 3 and 4.

Figure 2A:
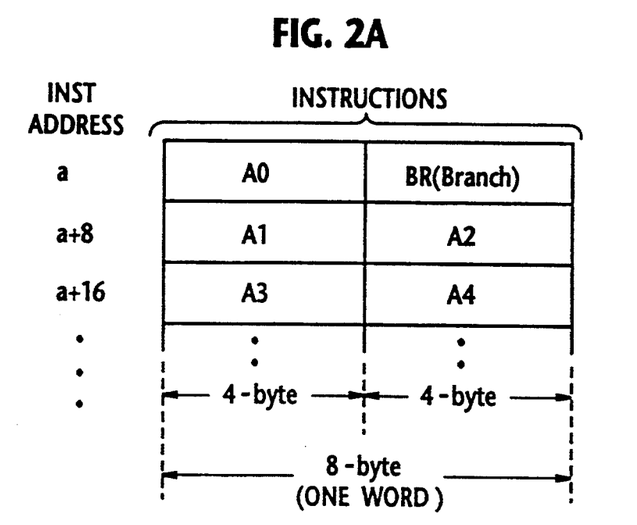
FIG. 2A is a table illustrating a instruction sequence stored in the cache memory shown in FIG. 1.

FIG. 2A is a diagram schematically an instruction sequence A0→BR(Branch)→A1→A2→A3→A4→ stored in the cache memory 22. It is assumed that these six instructions are derived from the cache memory 22 as a group whose length is one word (8-byte) and which includes two instructions as illustrated. Accordingly, the instruction address at the left side are depicted by "a", "a+8", "a+16" wherein the address "a" is the initial address of the instruction sequence in question. It is understood that the adder 28 increments the address applied thereto by 8-byte in this particular case. The instruction group(s) derived from the cache memory 22 is stored in a suitable buffer (not shown in the accompanying drawings) and then the instructions are sequentially applied to the execution unit 32.

Figure 2B:
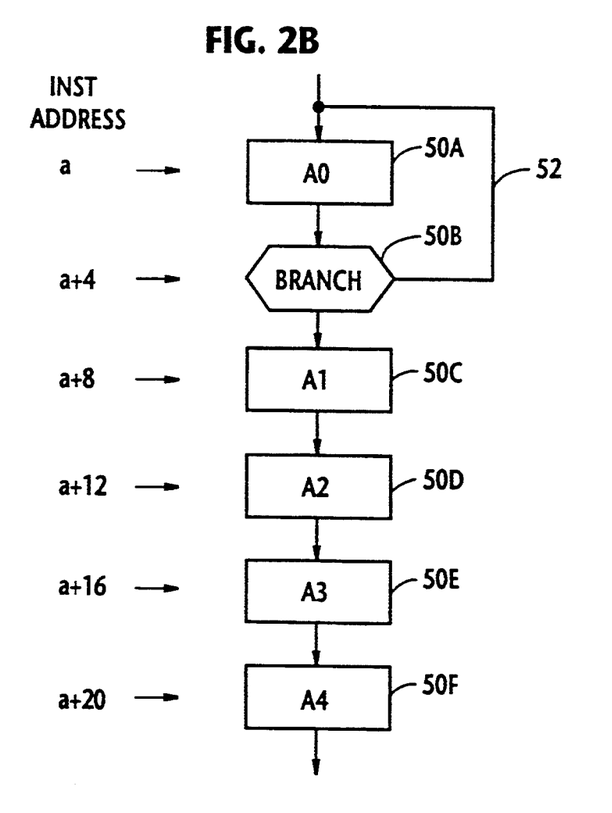
FIG. 2B is a flow chart for illustrating a routine which executes the instructions listed in FIG. 2A.

FIG. 2B is a flow-chart depicting a routine which executes the above-mentioned instructions A0-A4 at steps 50A-50F. For the sake of a better understanding, FIG. 2B shows the addresses of the instructions A0-A4 in the cache memory 22. As shown, a very small branch loop 52 is established between steps 50A and 50B.

Figure 3:
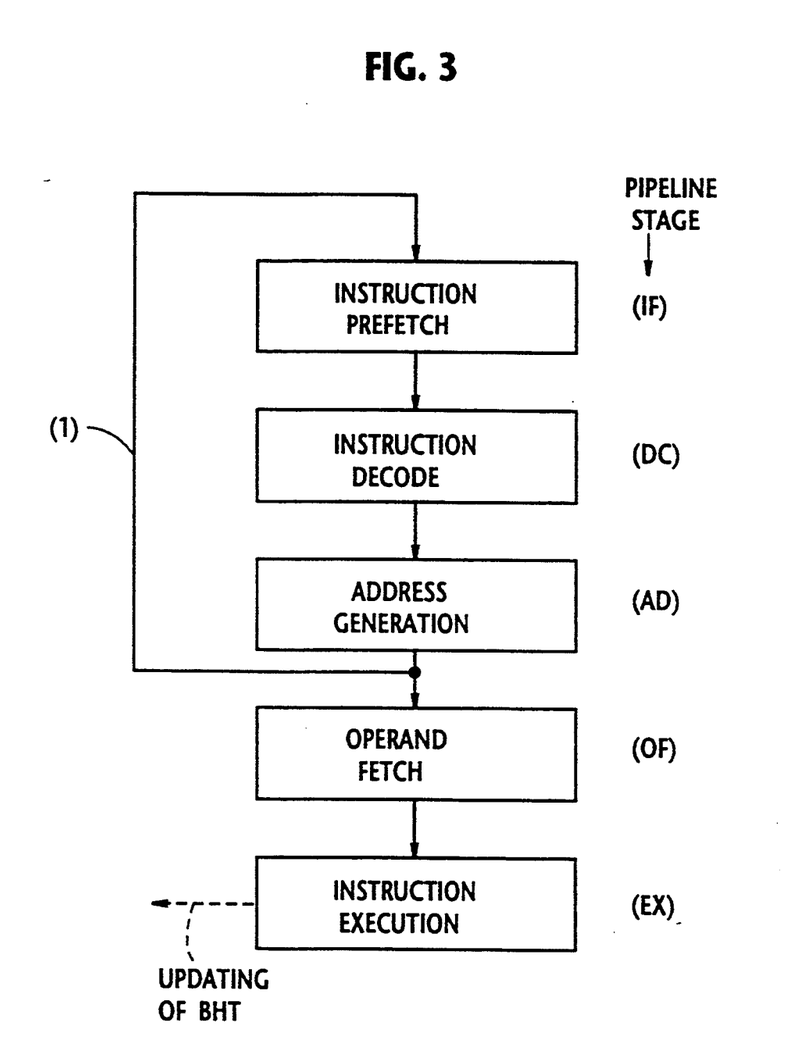
FIG. 3 is a diagram showing pipelined operations including five stages IF, DC, AD, OF and EX.

FIG. 3 is a diagram showing pipelined operations including five stages denoted by IF, DC, AD, OF and EX. A line extending from the stage AD to the stage IF corresponds to the line (1) via which the initial instruction address (viz., "a") is applied to the prefetch address register 20. The stages IF, DC, AD, OF and EX implement the following operations:

(a) IF: Instruction prefetch at block 20;
(b) DC: Instruction decode at block 30;
(c) AD: Address generation at block 18;
(d) OF: Operand fetch at blocks 18, 34; and
(e) EX: Instruction execution at blocks 18, 36.

In the case where the miss hit of the branch instruction address at the comparator 46 of the BHT section 40 is found at the pipeline stage EX, the task controller 18 updates the BHT by writing thereinto the most highly guessed branch instruction address and the branch target thereof.

Figure 4:
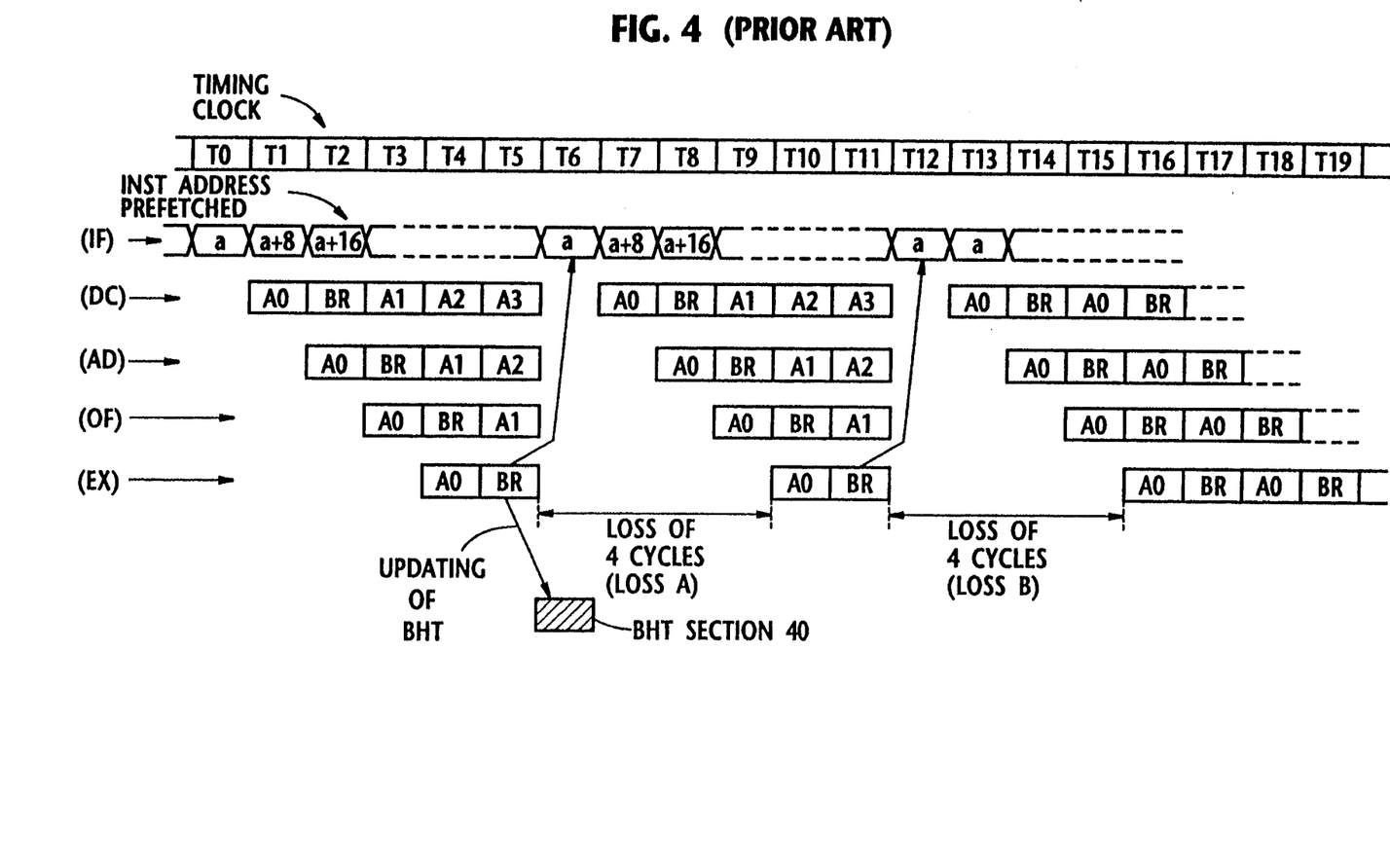
FIG. 4 is a timing chart which depicts the type of operation which invites the above mentioned machine cycle loss problem.

FIG. 4 is a timing chart which characterizes the prior art operations at the pipeline stages IF, DC, AD, OF and EX shown in FIG. 3. It is assumed that the BHT section 40 fails to search for the branch instruction address "a+4" (viz., miss hit) at time clock T0. Accordingly, the execution circuit 36 is unable to determine a branch target at time clock T5. In this instance, the operations implemented at all the stages IF-EX are canceled or rendered invalid. Thus, the task controller 18 carries out, at time clock T6, updating by writing the branch instruction address "a+4" into the memory 42 and also writing the branch target "a" into the memory 44 via the lines (3), (4). This means that the miss hit again occurs at the BHT 40 at time clock T6 in that the updating is implemented during the same time clock T6.

The operations during time clocks T6-T11 are exactly identical with those during time clocks T0-T5. That is, the execution circuit 36 is again unable to determine the branch target address "a" at time clock T11. At the next time clock T12, the comparator 4G detects the hit and thus the target address "a" is applied to the instruction prefetch address register 20. Therefore, the execution circuit 36 is now able to execute the branch operation at time clock T17. In the above-mentioned case, there exists the 4 cycle loss during T12-T15 (LOSS B) in addition to the 4 cycle loss during T6-T9 (LOSS A). This kind of problem is frequently encountered when the execution unit 32 executes a program sequence including short loops as indicated in FIG. 2B. This arises from the fact that, before completing the updating of the BHT, the next branch instruction should be executed.

Summing up, the above-mentioned prior art has encountered the problems that such a cycle loss as indicated by LOSS B is inevitably present in the case where the program sequence to be executed includes the aforesaid short type of branch loop.

SUMMARY OF THE INVENTION

In view of the above drawback it is an object of the present invention to provide an arrangement by which machine cycle loss due to the branch address miss hit can effectively be reduced.

More specifically an aspect of the present invention comes in an arrangement for predicting a branch target address in a digital data processing system, including: a prefetching unit to prefetch an instruction address of a given instruction sequence; a first memory which stores a plurality of branch instruction addresses, a unit coupled to receive the prefetched instruction address which is utilized to output a branch instruction address coincident therewith from the first memory. The first memory subject to updating wherein a new branch instruction address is written thereinto a second memory for storing a plurality of branch target addresses which correspond to the branch instruction addresses memorized in the first memory on a one to one basis. The second memory is coupled to receive the prefetched instruction address which is utilized to derive the branch target address corresponding to the branch instruction address coincident with the prefetched instruction address in first memory, the second meaning being subject to updating wherein a new branch target address is written thereinto A comparator is provided to compare an instruction address outputted from first memory with the prefetched instruction address applied from the prefetching unit, the comparison result is being used to control the instruction address prefetching A company units arranged to compare the prefetched instruction applied from the prefetching unit with said new branch target address and for generating a match/miss match signal indicative of whether the prefetched instruction applied from the prefetching unit and the new branch target address match or miss match, the match/miss match signal being used to control the instruction address prefetching at at the prefetch unit; and a means being arranged to receive the branch target address derived from second memory and said new branch target address, the means selecting said new branch target address in the event that the match/miss match signal from the company unit indicates a match, and selecting the branch target address derived from said second memory in the event that the match/miss match signal from the company unit indicates a miss-match, the output of the means being applied to the prefetch unit.

BRIEF DESCRIPTION OF THE DRAWINGS

The features and advantages of the present invention will become more clearly appreciated from the following description taken in conjunction with the accompanying drawings in which like portions are denoted by like reference numerals and in which.

DETAILED DESCRIPTION OF THE PREFERRED EMBODIMENTS

A first embodiment of the present invention will be discussed with reference to FIGS. 5 and 6.

Figure 5:
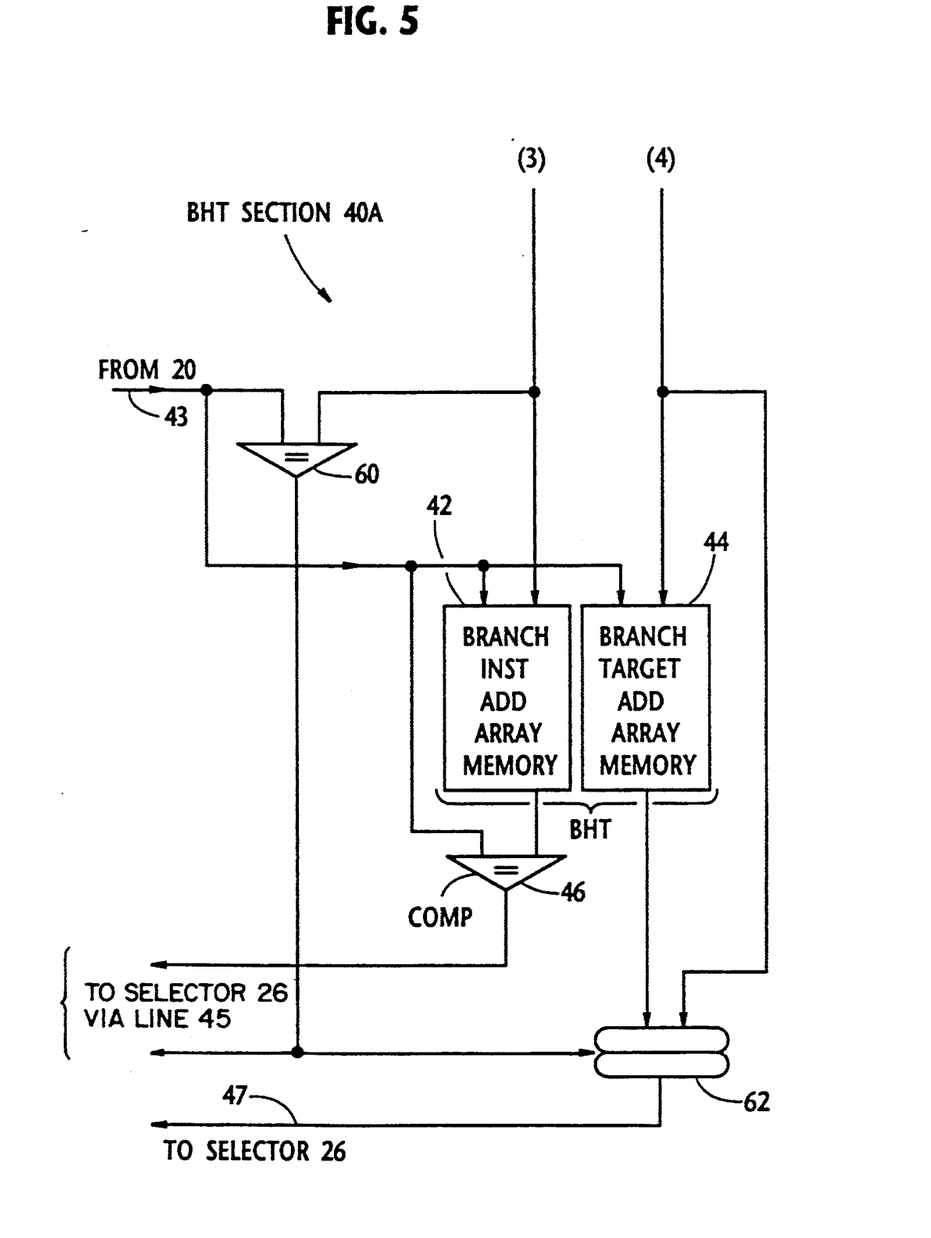
FIG. 5 is a block diagram showing the arrangement which characterizes a first embodiment of the present invention.

FIG. 5 is a block diagram showing an arrangement of a BHT section 40A which characterizes the first embodiment. The section 40A differs, in terms of the arrangement, from the counterpart 40 (FIG. 1) in that the section 40A further includes a comparator 60 and a selector 62.

The comparator 60 is provided with two inputs, one of which is coupled to receive the prefetched instruction address via the line 43 while the other input is directly coupled to the line (3) for receiving a new branch instruction address applied from the task controller 18 for the purpose of updating the BHT. The comparator 60 has the output coupled to the selector 26 via the line 45 and also to the selector 62 for controlling the operation thereof. The selector 62 is arranged to receive a branch target address outputted from the BTA array memory 44 and a new branch target address applied from the task controller 18 for updating the BHT via the line (4). The operations of the remaining blocks 42, 44 and 46 of FIG. 5 have already discussed in the opening paragraphs and accordingly the further descriptions thereof will be omitted for brevity.

Figure 6:
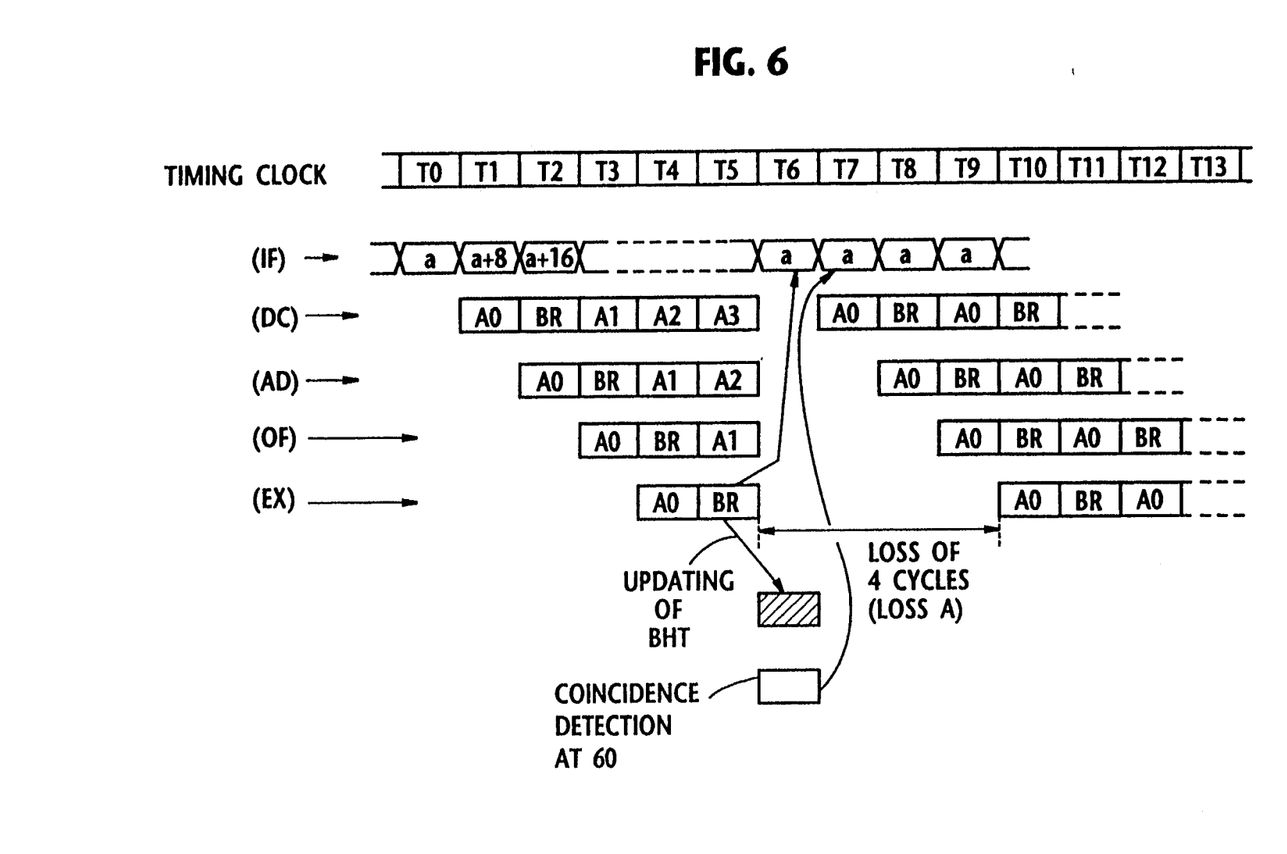
FIG. 6 is a timing chart similar to that shown in FIG. 4 which shows the manner in which the operations are performed with the first embodiment of the present invention.

FIG. 6 is a timing chart which characterizes the operations of the first embodiment at the pipeline stages IF, DC, AD, OF and EX shown in FIG. 3.

As in the prior art, it is assumed that the BHT section 40A fails to search for the branch instruction address "a+4" at time clock T0. Accordingly, the execution circuit 36 is unable to determine a branch target at time clock T5. In this instance, the operations implemented at all the stages IF-EX are canceled or rendered invalid. Thus, the task controller 18 carries out, at time clock T6, updating the BHT by writing a new data including the branch instruction address "a+4" into the memory 42 and also writing a new data including the branch target address "a" in this particular case.

In accordance with the first embodiment, the comparator 60 is able to detect, during clock time T6, the coincidence between the prefetched instruction address applied from the register 20 and the new branch instruction address "a+4". Thus, the comparator 60 issues, during the same time clock T6, the control signal indicative of the comparison hit (viz., coincidence) and applies same to the selector 62. Accordingly, the selector 62 is allowed to pass the new branch target address "a" to the selector 26 via the line 47 at the next time clock T6. It is understood therefore that: (a) the execution circuit 36 executes the branch operation BR at time clock T11 and (b) LOSS B (FIG. 4) inherent in the prior art can be eliminated according to the first embodiment.

Figure 7:
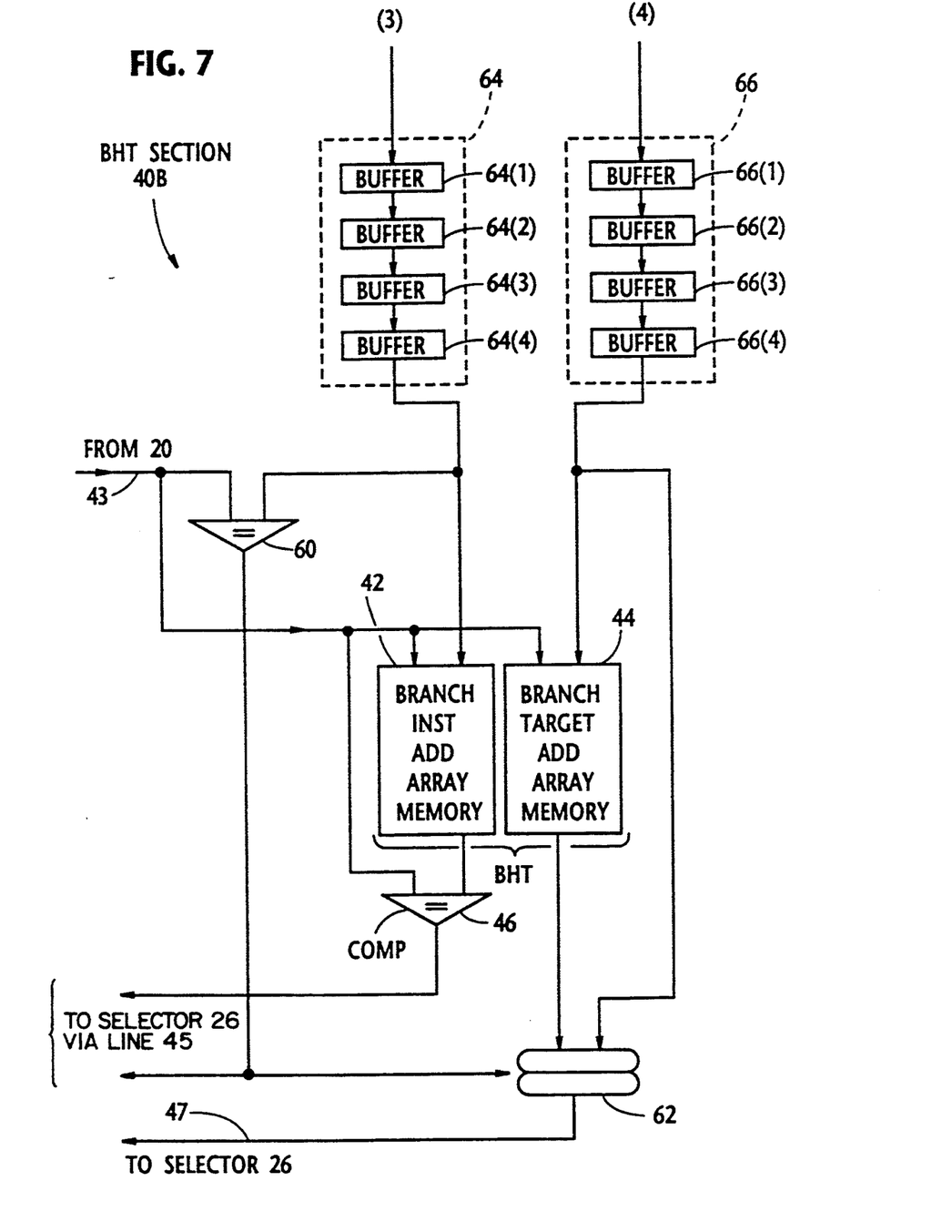
FIGS. 7 and 8 are block diagrams showing the arrangements which characterizes second and third embodiments of the present invention, respectively.

Reference is made to FIG. 7 which shows, in block diagram form, an arrangement of a second embodiment of the present invention. As compared with the first embodiment of FIG. 5, the second embodiment further includes a first and second buffer groups 64, 66. The first buffer group 64 is comprised of four buffers 64(1)-64(4). Similarly, the second buffer group 66 includes four buffers 66(1)-66(4). The second embodiment is well suited for the case wherein four time clocks are required to write the abovementioned new address data into the array memories 42, 44. It should be noted that the number of the buffers in each of the buffer groups 64, 66 is not limited to four (4) and may be changed to any number depending on a computer system design.

Figure 8:
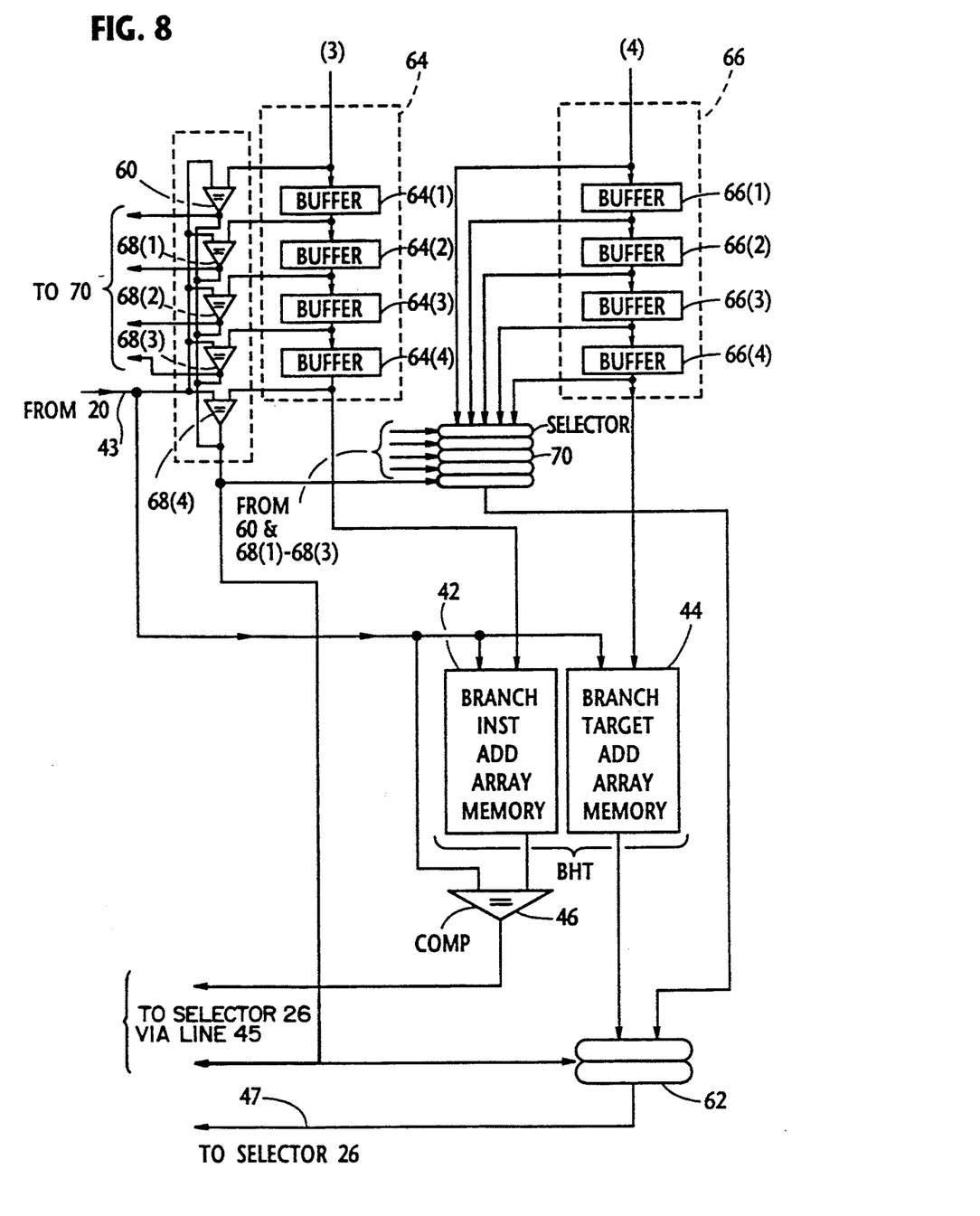

Referring now to FIG. 8, wherein a third embodiment of the present invention is illustrated in block diagram form. The third embodiment further includes four comparators 68(1)-68(4) and a selector 70 in addition to the arrangement of the second embodiment. It is clearly understood that when one of the comparators 60 and 68(1)-68(4) detects coincidence between the two input data thereof, the selector 70 selects the corresponding new address data to be applied to the address array memory 44 for the updating operation. As in the second embodiment, the number of the buffers in each of the buffer groups 64, 66 is not limited to four. The third embodiment is very advantageous in that it includes all the features referred to the first and second embodiments although its hardware arrangement is somewhat complex as compared therewith.

It will be understood that the above disclosure is representative of only a few possible embodiments of the present invention and that the concept on which the invention is based is not specifically limited thereto.

What is claimed is:

1. A device for predicting a branch target address, comprising:
   a prefetch unit operative to prefetch instruction addresses of a given instruction sequence;
   a memory for storing a branch history table, said memory having a first memory section for storing a plurality of branch instruction addresses and a second memory section for storing a plurality of branch target addresses, each of said branch target addresses corresponding to one of said branch instruction address on a one to one basis, said branch history table receiving prefetched branch instruction addresses from said prefetch unit;
   an execution unit executing instructions under pipeline control, said executing unit supplying a new branch instruction address and a corresponding new branch target address to said branch history table when a prediction of a branch target address fails upon execution of a branch instruction corresponding to said branch target address in said execution unit;
   a first comparator coupled to said prefetch unit and said branch history table, said first comparator comparing a prefetched branch instruction address from said prefetch unit with a branch instruction address from said first memory section and outputting a first control signal when said prefetched branch instruction address from said prefetch unit matches said branch instruction address from said first memory section;
   a second comparator coupled to said prefetch unit and said executing unit, said second comparator comparing a branch instruction address from said prefetch unit with said new branch instruction address being supplied to said branch history table and being used to update said branch history table and outputting a second control signal when said branch instruction address from said prefetch unit matches said new branch instruction address being supplied to said branch history table and being used to update said branch history table; and a selector receiving a branch target address from said second memory section and said new branch target address being supplied to said branch history table from said execution unit for outputting one of said branch target address from said second memory section and said new branch target address being supplied to said branch history table from said execution unit in response to said second control signal, wherein said prefetch unit selects said output from said selector in response to said first control signal.

2. A device as recited in claim 1 further comprising a first and second plurality of buffers sequentially connected between said execution unit and said branch history table for temporarily holding said new branch instruction address being supplied to said branch history table and said corresponding new branch target address being supplied to said branch history table, respectively.

3. A device as recited in claim 2 further comprising:

a plurality of comparators corresponding on a one to one basis to said first plurality of buffers and connected to compare a new branch instruction address from said buffer with a single branch instruction address from said prefetch unit, each of said comparators outputting a control signal indicating a match therebetween; and a second selector connected to receive a new branch target address from each of said second plurality of buffers and to select one of said new branch target addresses from each of said second plurality of buffers in response to a control signal from said plurality of comparators and to supply said selected output to said selector.

4. An arrangement for predicting a branch target address in a digital data processing system, comprising:

first means for prefetching an instruction address of a given instruction sequence;

second means for storing a plurality of branch instruction addresses, said second means being coupled to receive a prefetched instruction address from said first means, said prefetched instruction address also being utilized to index a branch instruction address, said second means being supplied with a new branch instruction address upon failure of a branch target prediction;

third means for storing a plurality of branch target addresses corresponding to said branch instruction addresses memorized in said second means on a one to one basis, said third means being coupled to receive said prefetched instruction address which is utilized to derive said branch target address corresponding to said branch instruction address coincident with said prefetched instruction address in said second means, said third means being supplied with a new branch target address when said second means is updated;

fourth means being arranged to compare an instruction address outputted from said second means with said prefetched instruction address applied from said first means, and for outputting a comparison result of said fourth means as a control signal to said first means to control instruction address prefetching by said first means;

fifth means being arranged to compare a prefetched instruction address applied from said first means with said new branch instruction address being supplied to said second means and for generating a match/miss-match signal indicative of whether said prefetched instruction address applied from said first means and said new branch instruction address match or miss-match; and sixth means being arranged to receive a branch target address from said third means and said new branch target address being supplied to said third means and being coupled to receive said match/miss-match signal from said fifth means, said sixth means selecting said new branch target address when said match/miss-match signal from said fifth means indicates a match, and selecting said branch target address from said third means when said match/miss-match signal from said fifth means indicates a miss-match, said output of said sixth means being applied to said first means.

5. An arrangement as claimed in claim 4, further comprising:

a plurality of first buffers arranged in series for delaying application of said new branch instruction address to said second means; and a plurality of second buffers arranged in series for delaying application of said new branch target address to said third means.

6. An arrangement as claimed in claim 5, further comprising:

a plurality of comparators each of which is arranged to compare a prefetched instruction applied from said first means with said new branch instruction address delayed by one or more of the first buffers; and a selector being coupled to said second plurality of buffers and said plurality of comparators for selecting a new branch target address in response to a match being detected by one of said plurality of comparators and inputting said selected new branch target address to said sixth means.

* * * * *